US007930497B2

(12) United States Patent
Crockett et al.

(10) Patent No.: US 7,930,497 B2
(45) Date of Patent: Apr. 19, 2011

(54) USING MULTIPLE SIDEFILES TO BUFFER WRITES TO PRIMARY STORAGE VOLUMES TO TRANSFER TO CORRESPONDING SECONDARY STORAGE VOLUMES IN A MIRROR RELATIONSHIP

(75) Inventors: Robert Nelson Crockett, Tucson, AZ (US); William Frank Micka, Tucson, AZ (US); David Michael Shackelford, Tucson, AZ (US); Warren Keith Stanley, Loveland, CO (US)

(73) Assignee: International Business Machines Corporation, Armonk, NY (US)

( * ) Notice: Subject to any disclaimer, the term of this patent is extended or adjusted under 35 U.S.C. 154(b) by 554 days.

(21) Appl. No.: 11/972,614

(22) Filed: Jan. 10, 2008

(65) Prior Publication Data

US 2009/0182960 A1 Jul. 16, 2009

(51) Int. Cl.
*G06F 12/00* (2006.01)
*G06F 13/00* (2006.01)

(52) U.S. Cl. .......................... 711/162; 711/100; 711/154

(58) Field of Classification Search .................. 711/161, 711/100, 154, 162
See application file for complete search history.

(56) References Cited

U.S. PATENT DOCUMENTS

| 5,592,618 | A  * | 1/1997  | Micka et al. ..................... 714/54 |
| 6,842,835 | B1   | 1/2005  | Fujimoto et al. |
| 6,848,021 | B2   | 1/2005  | Segev et al. |
| 2002/0178336 | A1 * | 11/2002 | Fujimoto et al. ............... 711/165 |
| 2003/0028723 | A1 * | 2/2003  | Segev et al. .................... 711/113 |
| 2004/0030837 | A1 * | 2/2004  | Geiner et al. ................... 711/133 |
| 2004/0243892 | A1 * | 12/2004 | McBride et al. ............... 714/724 |
| 2005/0102553 | A1 * | 5/2005  | Cochran et al. .................... 714/6 |
| 2005/0193179 | A1 * | 9/2005  | Cochran et al. ............... 711/162 |
| 2005/0204108 | A1   | 9/2005  | Ofek et al. |
| 2005/0210320 | A1 * | 9/2005  | Vincent ............................ 714/11 |
| 2005/0256972 | A1 * | 11/2005 | Cochran et al. ................ 709/245 |
| 2006/0069885 | A1 * | 3/2006  | Matsui et al. .................. 711/154 |
| 2006/0101213 | A1   | 5/2006  | Morita |
| 2006/0212667 | A1 * | 9/2006  | Mikami ........................ 711/162 |

OTHER PUBLICATIONS

DFSMS Advanced Copy Services; IBM; Apr. 2001.*
IBM Enterprise Storage Server; Kulzer et al.; IBM; Jul. 1999.*
Linux on IBM eServer zSeries and S/390: Application Development; Geiselhart et al.; IBM; Jul. 2002.*
Definition of Multithreading; TechTerms.com.*
IBM eServer zSeries 990 Specification; IBM; copyright 2005.*

* cited by examiner

*Primary Examiner* — Tuan V. Thai
(74) *Attorney, Agent, or Firm* — David W. Victor; Konrad Raynes & Victor LLP

(57) ABSTRACT

Provided are an article of manufacture, method, and system for using multiple sidefiles to buffer writes to primary storage volumes to transfer to corresponding secondary storage volumes in a mirror relationship. Information is provided on a mirror relationship for primary storage volumes and corresponding secondary storage volumes, wherein writes to the primary storage volumes are transferred to the secondary storage volumes according to the mirror relationship. A plurality of sidefiles are associated with the primary storage volumes in the mirror relationship. A write is received to one of the primary storage volumes in the mirror relationship. One of the sidefiles associated with the primary storage volume for which the write is received is selected and the write is buffered in the selected sidefile. Writes to the primary storage volumes buffered in the sidefiles are transferred to the corresponding secondary storage volumes.

20 Claims, 4 Drawing Sheets

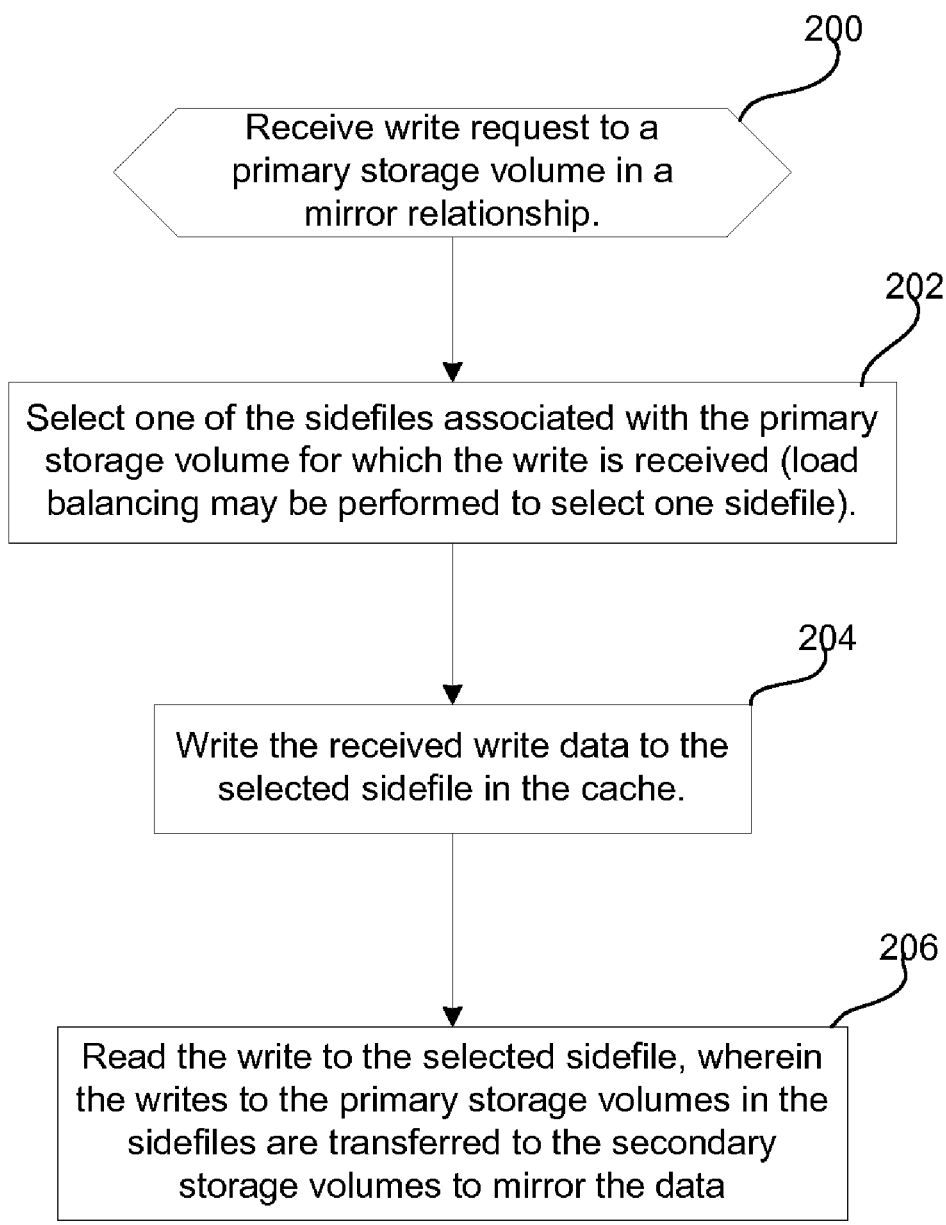

USING MULTIPLE SIDEFILES TO BUFFER WRITES TO PRIMARY STORAGE VOLUMES TO TRANSFER TO CORRESPONDING SECONDARY STORAGE VOLUMES IN A MIRROR RELATIONSHIP

BACKGROUND OF THE INVENTION

1. Field of the Invention

The present invention relates to a method, system, and program for using multiple sidefiles to buffer writes to primary storage volumes to transfer to corresponding secondary storage volumes in a mirror relationship.

2. Description of the Related Art

Disaster recovery systems typically address two types of failures, a sudden catastrophic failure at a single point in time or data loss over a period of time. In the second type of gradual disaster, updates to volumes may be lost. To assist in recovery of data updates, a copy of data may be provided at a remote location. Such dual or shadow copies are typically made as the application system is writing new data to a primary storage device. Different copy technologies may be used for maintaining remote copies of data at a secondary site, such as International Business Machine Corporation's ("IBM") Extended Remote Copy (XRC), Coupled XRC (CXRC), Global Copy, and Global Mirror Copy.

In data mirroring systems, data is maintained in volume pairs. A volume pair is comprised of a volume in a primary storage device and a corresponding volume in a secondary storage device that includes an identical copy of the data maintained in the primary volume. Primary and secondary storage controllers may be used to control access to the primary and secondary storage devices.

A primary storage controller may manage multiple volumes in the primary storage. Volumes in the primary storage may be assigned to a session, which may be in a mirror copy relationship with secondary volumes maintained at a secondary storage controller. In current systems, the primary storage controller maintains one sidefile for each session to buffer updates to data in the primary volumes in the session to mirror to corresponding secondary volumes in the mirror relationship. A system data mover that runs in a host system may spawn a process for each sidefile in the primary storage controller to read updates for the session from the sidefile and transfer those updates to the corresponding secondary volumes.

There may be many write streams creating record sets in a single sidefile, but only one read stream to read the entries back out to transfer to the secondary file system. As the size of volumes is increased and number of Input/Output (I/O) requests increases, there may be many write streams to even a single device. This can cause a disparity between the rate at which sidefile entries are created and the rate at which they are read and removed, resulting in the sidefile size increasing. Eventually, the size may reach a point where it is necessary to either slow down the write rate to the primary volumes in the session associated with the sidefile or suspend the session.

Write pacing or device blocking may be used to limit the rate at which writes are allowed and the sidefile is filled to balance the reads. Suspending the session may cause the mirroring operations to stop for some period of time until later resumed after the peak write rate period has ended.

One technique to balance the read and write streams involves providing multiple sessions for a set of volumes, also known as a logical subsystem (LSS). The system data mover may then maintain a separate reader for each of these physical sessions comprising a portion of the primary volumes in the LSS. Each session for a portion of the LSS has a separate sidefile and reads from separate sidefiles may be performed in parallel.

There is a need in the art to provide improved techniques for provisioning sidefiles to use to mirror updates to a primary volume to a secondary volume.

SUMMARY

Provided are an article of manufacture, method, and system for using multiple sidefiles to buffer writes to primary storage volumes to transfer to corresponding secondary storage volumes in a mirror relationship. Information is provided on a mirror relationship for primary storage volumes and corresponding secondary storage volumes, wherein writes to the primary storage volumes are transferred to the secondary storage volumes according to the mirror relationship. A plurality of sidefiles are associated with the primary storage volumes in the mirror relationship. A write is received to one of the primary storage volumes in the mirror relationship. One of the sidefiles associated with the primary storage volume for which the write is received is selected and the write is buffered in the selected sidefile. Writes to the primary storage volumes buffered in the sidefiles are transferred to the corresponding secondary storage volumes.

BRIEF DESCRIPTION OF THE DRAWINGS

FIG. 7 illustrates an embodiment of operations to process a write to a primary storage volume in a mirror relationship.

DETAILED DESCRIPTION

Figure 1:
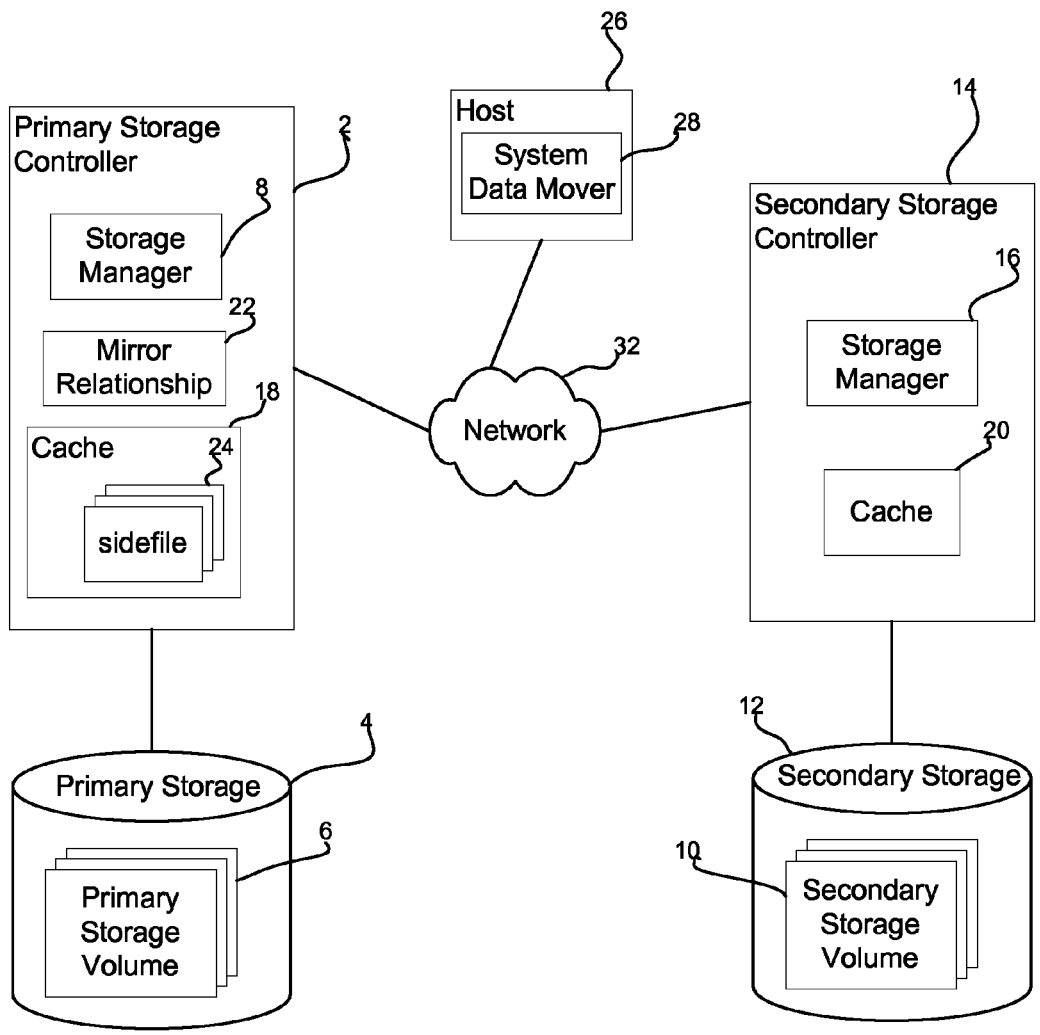
FIG. 1 illustrates an embodiment of a network computing environment.

FIG. 1 illustrates an embodiment of a network computing environment. A primary storage controller 2 manages Input/Output (I/O) requests to a primary storage 4 in which primary storage volumes 6 are configured. The primary storage controller 2 includes a storage manager 8 program that manages I/O requests to the primary storage volumes 6 and may maintain mirror storage policies to mirror data in the primary storage volumes to corresponding secondary storage volumes 10 in a secondary storage 12. A secondary storage controller 14 includes a storage manager 16 program to manage I/O access to the secondary storage 12.

The primary 2 and secondary 14 storage controllers include a cache 18 and 20, respectively, to buffer read and write data to their corresponding storage volumes 6 and 10. The primary 2 and secondary 14 storage controllers may receive read and write requests from host systems (not shown).

The primary storage manager 8 may maintain information on a mirror relationship 22 indicating primary storage volumes 6 and secondary storage volumes 10 in a mirror relationship 22.

To manage a mirror relationship 22, the storage manager 8 in the primary storage controller 2 may buffer updates to primary storage volumes 6 in a sidefile 24 in the cache 18.

After the system data mover 28 controls the making of an initial copy of the primary storage volumes 6 to the secondary storage volumes 10 in the mirror relationship, any subsequent updates to the primary storage volumes 6 included in the mirror policy relationship are buffered in the sidefile 24 maintained for the primary storage volumes 6 in the mirror relationship 22 and then transferred over to the secondary storage volumes 10 to mirror. In certain embodiments, the System Data Mover (SDM) 28 may control the initial copy by reading all of the tracks from the primary and writing them to the secondary. The SDM 28 may indicate to the primary storage controller 2 when to create sidefile 24 entries for updates. In further embodiments, each recordset of a write contains a timestamp of when it was created. The SDM 28 may use this timestamp to determine whether the update occurred before or after the track read it performed as part of the initial copy.

A host 26 including a system data mover 28 program may read data from the side files 24 and write the data to a corresponding secondary storage volume 10 indicated in the mirror relationship 22. The system data mover 28 may also maintain mirror relationship information indicating primary storage volumes 6 and secondary storage volumes 10 in the mirror relationship 22. In one embodiment, the system data mover 28 may spawn a separate operating system process for each sidefile 24 in the cache 18 to read write data to primary storage volumes 6 in a mirror relationship from the sidefile 24 and write to the corresponding secondary storage volume 10 indicated in the mirror relationship. In this way, the system data mover 28 may concurrently read and transfer write data in different sidefiles 24. In an alternative embodiment, the storage manager 8 may spawn one process for each sidefile 24 to read writes from the sidefile 24 to transfer to corresponding secondary storage volumes 10 in the mirror relationship 22.

The primary 2 and secondary 14 storage controllers and host 26 may communicate over a network 32. The network 32 may comprise a Storage Area Network (SAN), Local Area Network (LAN), Intranet, the Internet, Wide Area Network (WAN), peer-to-peer network, wireless network, arbitrated loop network, etc. The storages 4 and 12 may each comprise an array of storage devices, such as a Just a Bunch of Disks (JBOD), Direct Access Storage Device (DASD), Redundant Array of Independent Disks (RAID) array, virtualization device, tape storage, flash memory, etc.

In certain embodiments, volumes 6 and 10 in the storage systems 4 and 12 maintained by a storage controller may be assigned to one or more sessions. Volumes may be organized in a logical subsystem (LSS), and the volumes in a LSS maintained by a primary storage controller 2 may be assigned to a session.

Figure 2:
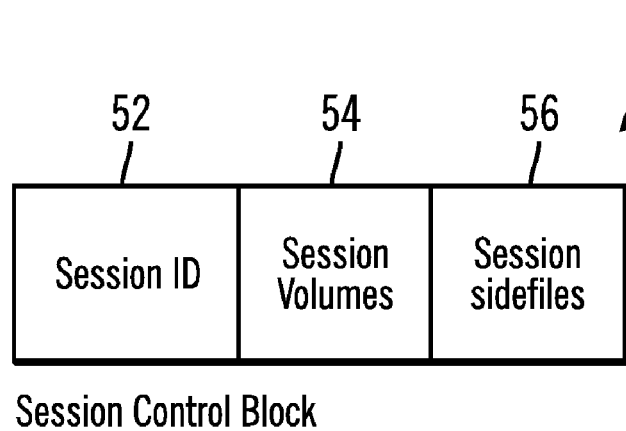
FIGS. 2, 3, and 4 illustrate embodiments of session control blocks.

In one embodiment, multiple sidefiles 24 may be associated with the primary storage volumes 6 in one session, which are part of a mirror relationship. FIG. 2 illustrates an embodiment of a session control block 50 having information on one session, including a session identifier (ID) 52, session volumes 54 included in the session 50, and session sidefiles 56 indicating one or more sidefiles 24 associated with the session. In one embodiment, if there are multiple sidefiles associated with a session, then a write to a primary storage volume 6 in a mirror relationship 22 may be stored in any of the sidefiles 24 associated with that session, as indicated in field 56. Thus, if one process is spawned (by the system data mover 28 or some other component) to read writes for each sidefile 24, then writes for primary storage volumes 6 in a session that is in a mirror relationship 22 may be concurrently read from the multiple sidefiles 24 in which they are stored by the processes spawned to process writes in the sidefiles 56. In this way, a write to a set of primary storage volumes 6 may be buffered in any one of the sidefiles associated with those volumes 6 or session including such volumes.

In an additional embodiment, a group of primary storage volumes 6 may be assigned to a plurality of sessions, where each session has one sidefile 24. In this way, writes to one of the primary storage volumes assigned to a plurality of sessions may be buffered in any of the sidefiles associated with the sessions to which the group of primary storage volumes is assigned. In one embodiment, multiple sessions may be assigned to a group of volumes by including the group of volumes in a primary session and one or more auxiliary sessions associated with the primary sessions. Each primary and auxiliary session may have their own sidefile, so writes to any of the primary storage volumes 6 in the group may be buffered in the sidefiles 24 for any primary and auxiliary session in which the group of primary storage volumes 6 is included.

Figure 3:
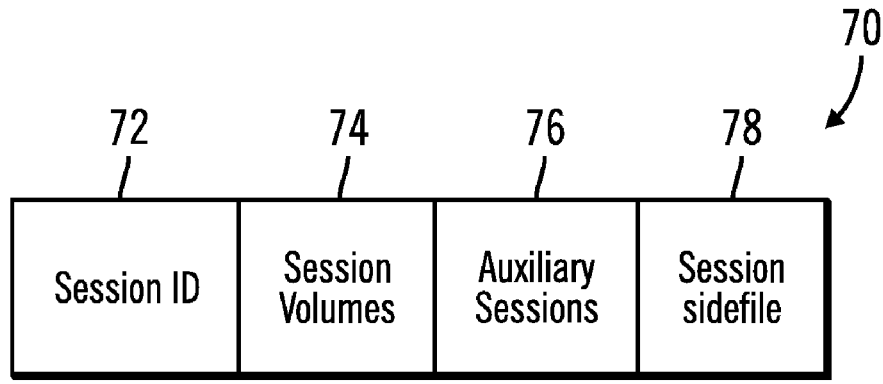
Figure 4:
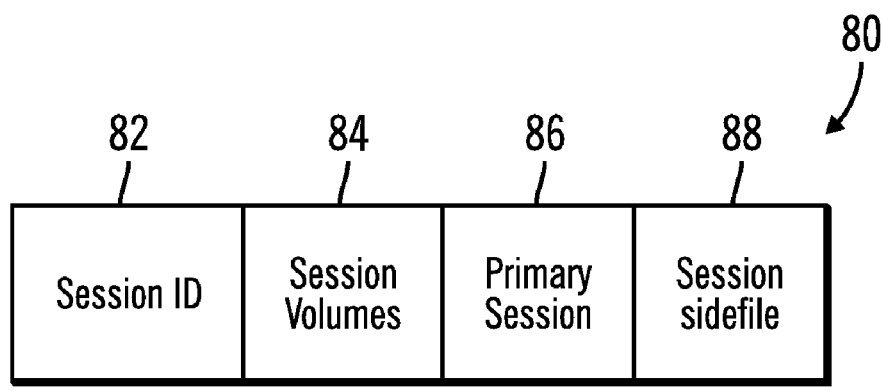

FIGS. 3 and 4 illustrate an alternative embodiment to FIG. 2 for associating a group of volumes with a plurality of sidefiles by including the group of volumes in primary and auxiliary sessions.

FIG. 3 illustrates an embodiment of a primary session control block 70 including a session identifier (ID) 72, session volumes 74 included in the primary session 70, auxiliary sessions 76 associated with the primary session 70, and a session sidefile 78 used to buffer writes for the primary session volumes 74.

FIG. 4 illustrates an embodiment of an auxiliary session control block 80 having a session identifier (ID) 82, session volumes 84 included in the auxiliary session 80, a primary session 86 with which the auxiliary session 80 is associated, and a session sidefile 78 used to buffer writes for the auxiliary session volumes 84. There may be multiple auxiliary session control blocks 80 associated with one primary session control block 70 to provide multiple sidefiles for a session.

In the embodiments of FIGS. 3 and 4, if the primary storage volumes are associated with primary and auxiliary sessions, each having their own sidefile, then a write to a primary storage volume 6 in a mirror relationship 22 may be stored in any of the sidefiles 24 of the primary and auxiliary sessions. Thus, if one process is spawned to read writes for each sidefile 24 that may be used for the primary storage volumes 6, then writes for those primary storage volumes 6 may be concurrently read from the multiple sidefiles 24 in which they are stored by the processes spawned to process writes in the sidefiles 78 and 88. In this way, a write to a set of primary storage volumes 6 may be buffered in any one of the sidefiles associated with those volumes 6 or primary and auxiliary sessions including such volumes.

Figure 5:
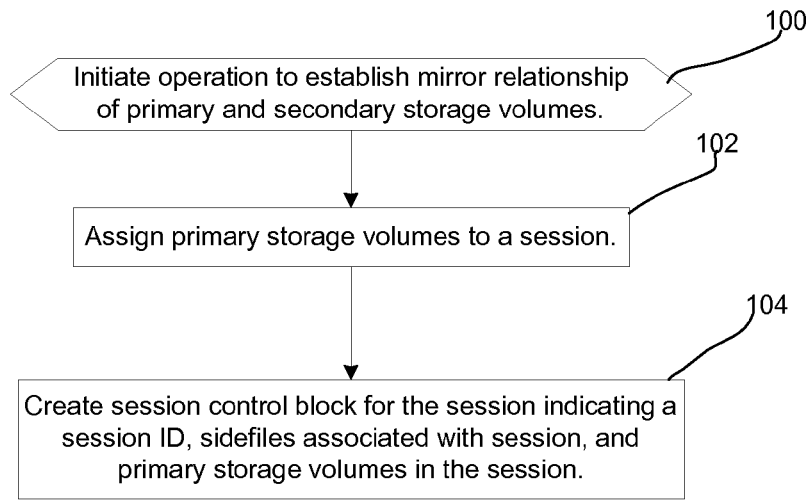
FIG. 5 illustrates an embodiment of operations to assign primary storage volumes in a mirror relationship to a session to use multiple sidefiles.

FIG. 5 illustrates an embodiment of operations performed by the storage manager 8 to provide multiple sidefiles 24 for use with primary storage volumes 6 in a mirror relationship 22 using the session control block 50 of FIG. 2. Upon initiating (at block 100) an operation to establish a mirror relationship 22, the storage manager 8 assigns (at block 102) primary storage volumes 6 to a session by creating (at block 104) a session control block 50 for the session indicating a session ID 52, one or more sidefiles 56 associated with session, and primary storage volumes in the session 54, which are also in the mirror relationship. Updates to the primary storage volumes 6 in the session 54 are buffered in the sidefiles 56 associated with the session and transferred to the corresponding secondary storage volumes 10 in the mirror relationship 22.

Figure 6:
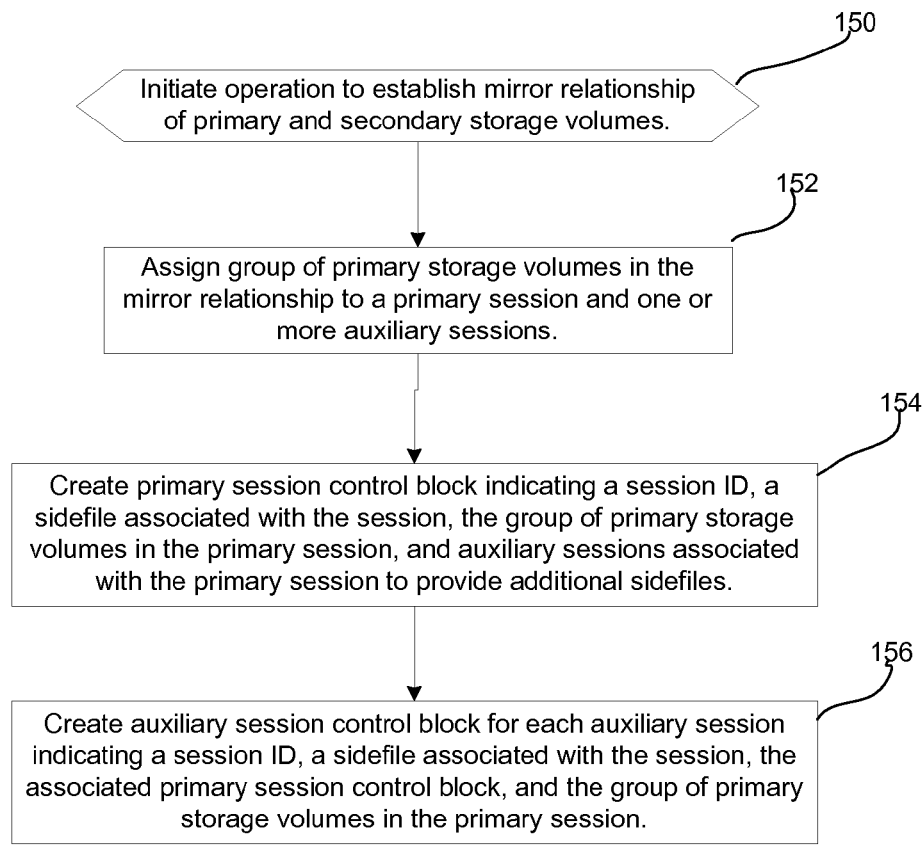
FIG. 6 illustrates an embodiment of operations to assign primary storage volumes in a mirror relationship to a plurality of session to use multiple sidefiles.

FIG. 6 illustrates an alternative embodiment of operations performed by the storage manager 8 to provide multiple sidefiles for use with primary storage volumes 6 in a mirror relationship 22 using the primary 70 and secondary 80 session control blocks of FIGS. 3 and 4. Upon initiating (at block 150) an operation to establish a mirror relationship 22 of primary 6 and secondary 10 storage volumes, the storage manager 8 assigns (at block 152) a group of primary storage volumes 6 in the mirror relationship 22 to a primary session and multiple auxiliary sessions. The storage manager 8 creates (at block 154) a primary session control block 70 indicating a session ID 72, the group of primary storage volumes in the primary session 74, a sidefile 78 associated with the session 74, and one or more auxiliary sessions 76 associated with the primary session to provide additional sidefiles for the primary storage volumes 6 in the mirror relationship 22. The storage manager 8 further creates (at block 156) an auxiliary session control block 80 for each auxiliary session indicating a session ID 82, primary volumes 84 associated with the auxiliary session, the primary session 86 with which the auxiliary session is associated, and a sidefile 88 used by the auxiliary session.

As discussed, the system data mover 28 may spawn a separate process for each sidefile 24 with which the primary storage volumes are associated, via a single session 50 (FIG. 2) or primary 70 (FIG. 3) and auxiliary 80 (FIG. 4) sessions, to allow concurrent reading and transferring of writes from the sidefiles 24 to the corresponding secondary storage volumes 10 in the mirror relationship 22.

FIG. 7 illustrates an embodiment of operations performed by the storage manager 8 and system data mover 28 to process writes to primary storage volumes 6 in a mirror relationship 22. Upon receiving (at block 200) a write request directed to a primary storage volume 6 in a mirror relationship 22, the storage manager 8 selects (at block 202) one of the sidefiles 24 associated with the primary storage volume for which the write is received. For instance, with the embodiment of FIG. 2, the primary storage volume to which the write is directed may be part of a session 50 having a plurality of sidefiles 56. Alternatively, in the embodiment of FIGS. 3 and 4, the primary storage volume to which the write is directed may be assigned to primary 70 and auxiliary 80 sessions to be associated with multiple sidefiles 78, 88. The storage manager 8 may select one of the sidefiles that may be used for the primary storage volume 6 by using a suitable load balancing technique known in the art, such as a technique based on the number of writes currently present in each sidefile 24 that may be used, a round robin selection technique, etc. The storage manager 8 then writes (at block 204) the received write data to the selected sidefile 24 in the cache 18.

The system data mover 28 (or storage manager 8) may spawn a process for each sidefile 24 to read (at block 206) the writes to the sidefile 24 in order to transfer the buffered writes to the secondary storage controller 14 to store in the corresponding secondary storage volumes 10 in the mirror relationship 22.

Described embodiments provide techniques to associate multiple sidefiles with a group of primary storage volumes in a mirror relationship to allow for concurrent reading and transferring of writes to the primary storage volumes buffered in the sidefiles to the corresponding secondary storage volumes in the mirror relationship.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The "article of manufacture" may comprise a transmitting station and a receiving station for transmitting and receiving transmission signals in which the code or logic is encoded, where the code or logic encoded in the transmission signal may be decoded and stored in hardware or a computer readable medium at the receiving and transmitting stations or devices. An "article of manufacture" comprises computer readable storage medium, hardware logic, and/or transmission transmitters or receivers in which code may be implemented. Those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 5, 6, and 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An article of manufacture comprising a computer readable storage medium having code executed to mirror data in a primary and secondary storage volumes, wherein the article of manufacture causes operations to be performed, the operations comprising:
    providing information on a mirror relationship for primary storage volumes and corresponding secondary storage volumes, wherein writes to the primary storage volumes are transferred to the secondary storage volumes according to the mirror relationship;
    associating a plurality of sidefiles with the primary storage volumes in the mirror relationship;
    receiving writes to the primary storage volumes in the mirror relationship;
    selecting the sidefiles associated with the primary storage volumes for which the is writes are received; and
    buffering the writes in the selected sidefiles, wherein writes to the primary storage volumes buffered in the sidefiles are transferred to the corresponding secondary storage volumes.

2. The article of manufacture of claim 1, wherein a separate process is spawned to read the writes in each sidefile to transfer to the secondary storage volumes and wherein the separate processes for multiple sidefiles associated with the primary storage volumes concurrently read the writes in the sidefiles associated with the primary storage volumes to transfer to the secondary storage volumes in the mirror relationship.

3. The article of manufacture of claim 1, wherein the sidefiles are associated with the primary storage volumes in a session, wherein writes to the primary storage volumes in the session are buffered in the sidefiles associated with the primary storage volumes in the session.

4. The article of manufacture of claim 1, wherein associating the sidefiles with the primary storage volumes in the session comprises:
    assigning the primary storage volumes in the mirror relationship to a plurality of sessions, wherein each of the sessions has a sidefile in which writes to the primary storage volumes are buffered.

5. The article of manufacture of claim 4, wherein assigning the primary storage volumes to the plurality of sessions comprises:
    creating a primary session and at least one auxiliary session associated with the primary session to which the primary storage volumes are assigned, wherein each of the primary and auxiliary sessions have one sidefile, and wherein writes to the primary volumes in the mirror relationship are stored in the sidefiles of the primary and auxiliary sessions to which the primary storage volumes are assigned.

6. The article of manufacture of claim 5, wherein creating the primary and auxiliary sessions comprises:
    indicating in a primary session control block the sidefile associated with the primary session, the primary storage volumes, and the at least one auxiliary session to which the primary storage volumes are assigned; and
    indicating in an auxiliary session control block for each of the at least one auxiliary session the sidefile associated with the auxiliary session and the primary session to which the primary storage volumes are assigned.

7. The article of manufacture of claim 1, wherein selecting one of the sidefiles comprises performing load balancing based on a number of the writes in the sidefiles to select one of the sidefiles for the received write.

8. The article of manufacture of claim 1, wherein a primary storage controller receives writes to the primary storage volumes from a plurality of host systems,
    wherein the sidefiles are implemented in a cache of the primary storage controller, wherein the writes in the sidefiles are transferred to a secondary storage controller to write to the secondary storage volumes mirroring the primary storage volumes.

9. A system for mirroring data in primary and secondary storage volumes, comprising:
    a cache;
    a storage manager in communication with the cache and executed to perform operations, the operations comprising:
        providing information on a mirror relationship for the primary storage volumes and corresponding secondary storage volumes, wherein writes to the primary storage volumes are transferred to the secondary storage volumes according to the mirror relationship;
        associating a plurality of sidefiles in the cache with the primary storage volumes in the mirror relationship;
        receiving writes to the primary storage volumes in the mirror relationship;
        selecting the sidefiles associated with the primary storage volumes for which the writes are received; and
        buffering the writes in the selected sidefiles, wherein writes to the primary storage volumes buffered in the sidefiles are transferred to the corresponding secondary storage volumes.

10. The system of claim 9, further comprising:
    a system data mover to spawn a separate process to read the writes in each sidefile to transfer to the secondary storage volumes and wherein the separate processes for multiple sidefiles associated with the primary storage volumes concurrently read the writes in the sidefiles associated with the primary storage volumes to transfer to the secondary storage volumes in the mirror relationship.

11. The system of claim 9, wherein the sidefiles are associated with the primary storage volumes in a session, wherein writes to the primary storage volumes in the session are buffered in the sidefiles associated with the primary storage volumes in the session.

12. The system of claim 9, wherein associating the sidefiles with the primary storage volumes in the session comprises:
  assigning the primary storage volumes in the mirror relationship to a plurality of sessions, wherein each of the sessions has a sidefile in which writes to the primary storage volumes are buffered.

13. The system of claim 12, wherein assigning the primary storage volumes to the plurality of sessions comprises:
  creating a primary session and at least one auxiliary session associated with the primary session to which the primary storage volumes are assigned, wherein each of the primary and auxiliary sessions have one sidefile, and wherein writes to the primary volumes in the mirror relationship are stored in the sidefiles of the primary and auxiliary sessions to which the primary storage volumes are assigned.

14. The system of claim 13, wherein creating the primary and auxiliary sessions comprises:
  indicating in a primary session control block the sidefile associated with the primary session, the primary storage volumes, and the at least one auxiliary session to which the primary storage volumes are assigned; and
  indicating in an auxiliary session control block for each of the at least one auxiliary session the sidefile associated with the auxiliary session and the primary session to which the primary storage volumes are assigned.

15. A method, comprising:
  providing information on a mirror relationship for primary storage volumes and corresponding secondary storage volumes, wherein writes to the primary storage volumes are transferred to the secondary storage volumes according to the mirror relationship;
  associating a plurality of sidefiles with the primary storage volumes in the mirror relationship;
  receiving writes to the primary storage volumes in the mirror relationship;
  selecting the sidefiles associated with the primary storage volumes for which the writes are received;
  buffering the writes in the selected sidefiles, wherein writes to the primary storage volumes buffered in the sidefiles are transferred to the corresponding secondary storage volumes.

16. The method of claim 15, wherein a separate process is spawned to read the writes in each sidefile to transfer to the secondary storage volumes and wherein the separate processes for multiple sidefiles associated with the primary storage volumes concurrently read the writes in the sidefiles associated with the primary storage volumes to transfer to the secondary storage volumes in the mirror relationship.

17. The method of claim 15, wherein the sidefiles are associated with the primary storage volumes in a session, wherein writes to the primary storage volumes in the session are buffered in the sidefiles associated with the primary storage volumes in the session.

18. The method of claim 15, wherein associating the sidefiles with the primary storage volumes in the session comprises:
  assigning the primary storage volumes in the mirror relationship to a plurality of sessions, wherein each of the sessions has a sidefile in which writes to the primary storage volumes are buffered.

19. The method of claim 18, wherein assigning the primary storage volumes to the plurality of sessions comprises:
  creating a primary session and at least one auxiliary session associated with the primary session to which the primary storage volumes are assigned, wherein each of the primary and auxiliary sessions have one sidefile, and wherein writes to the primary volumes in the mirror relationship are stored in the sidefiles of the primary and auxiliary sessions to which the primary storage volumes are assigned.

20. The method of claim 19, wherein creating the primary and auxiliary sessions comprises:
  indicating in a primary session control block the sidefile associated with the primary session, the primary storage volumes, and the at least one auxiliary session to which the primary storage volumes are assigned; and
  indicating in an auxiliary session control block for each of the at least one auxiliary session the sidefile associated with the auxiliary session and the primary session to which the primary storage volumes are assigned.

\* \* \* \* \*